Sept. 23, 1952          J. H. MARTIN                2,611,500
                     CONDUIT JUNCTION BOX
                      Filed July 5, 1950
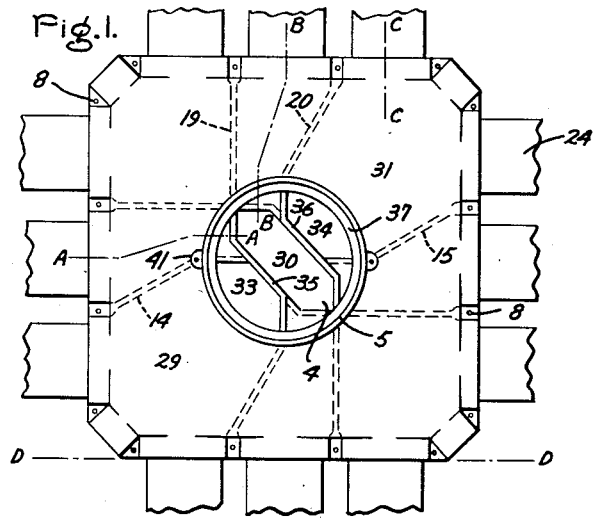
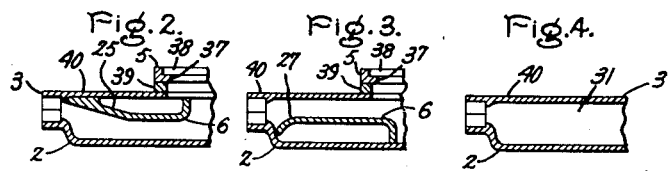
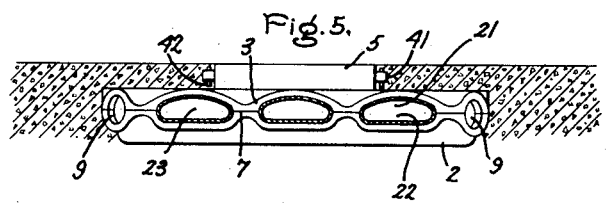
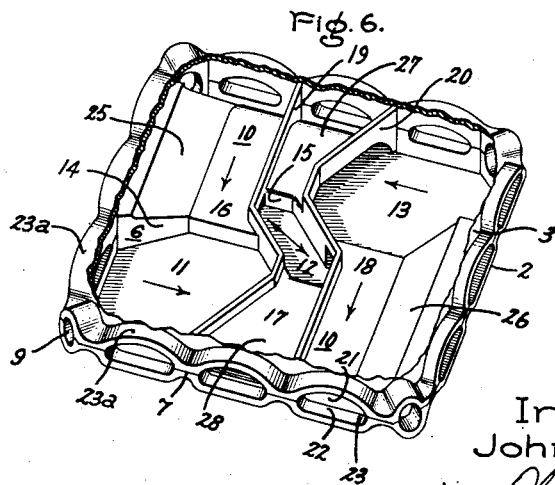
Inventor:
John H. Martin,
by
His Attorney.

UNITED STATES PATENT OFFICE 2,611,500

CONDUIT JUNCTION BOX

John H. Martin, Toronto, Ontario, Canada, assignor to General Electric Company, a corporation of New York Application July 5, 1950, Serial No. 172,164
In Canada December 23, 1949

3 Claims. (Cl. 220—3.4)

My invention relates to junction boxes used in electrical systems and more particularly to junction boxes used in duct or conduit systems of the concealed type that are installed in office and other buildings.

In order to supply a floor in an office building with the necessary power and communication services it is customary to lay fiber ducts in the floor material itself. These ducts may be either laid on the rough concrete floor slab before the concrete fill is poured in, thereby covering up the duct completely, or used equally as well in the monolithic type of construction. Electric cables such as are used to supply electrical energy in the form of power lines, communication or signal system lines, and telephone lines, may be threaded through the ducts. So that the whole floor area may be provided with adequate services, these ducts are usually spaced across the entire floor in two directions and at right angles to each other. Each system of wires is usually installed in a separate duct or raceway so that it may easily be traced and kept mechanically and electrically separate from the other systems. In this way telephone lines or communication signal system lines do not come in contact with the power supply line.

Junction boxes are provided at all crossover points, that is at all points where ducts intersect at right angles. These junction boxes are so constructed that the insulated cables may pass through channels in the boxes, which are so formed that it is not necessary to continue the fiber duct through the box. Consequently the cables can be spliced to corresponding cables travelling in a direction at right angles to them or they may be bent through a right angle in order to continue through the floor at right angles to their original direction. Cables travelling in one direction through the box are at a different level to the cables passing through the box in a perpendicular direction by virtue of a horizontal partition in the box. Vertical partitions are set up in the box so as to form channels or tunnels through which the cables pass thereby segregating the different types of supply lines. Since there are two levels in the box these channels must necessarily exist at one of two levels depending upon the path the cable is to take. Consequently a communicating passage is necessary between the two levels for purposes of making connections between upper and lower level cables. All cables in one layer or level travel in the same direction while those in the other level are at right angles to those in the first level. The number of communicating passages or vertical shafts common to both levels must equal the number of duct systems that form junctions in the box. Since the box is to be covered over by concrete fill the only means of access to these vertical shafts is through a hand hole provided centrally in the top of the box and having an extension or cover supporting ring extending upward to the floor surface so that a removable cover may be fitted into the flooring. This cover is usually circular and the opening is necessarily restricted to as small an area as possible since heavy objects placed on the floor would create high stresses in the cover supporting ring if too large an area were to be used for the opening. However, in keeping this opening area to a minimum, a workman is presented with a great deal of difficulty in making the connections in the vertical shaft in the box due to the restricted area in which he has to work.

In the past in boxes used to make connections for three separate services it has been customary to position the three vertical shafts diagonally across a square box. The cable channels have been built perpendicular to the opposite sides of the box with the channels in the lower level running at right angles to those in the upper level. Since the central vertical shaft of the three diagonally spaced shafts falls in the center of the box and directly beneath the cover opening, easy access is provided for this shaft. However, it is a time consuming task to make the necessary connections in the outer two vertical shafts since very little hand room is available in the opening.

It is therefore the object of my invention to provide an improved construction of junction box whereby considerably more working space is provided in order to make the necessary connections between cables at the two levels in the box, and at the same time retain a minimum size cover plate for the hand opening at the top of the box.

It is a further object of my invention to so distort the vertical partitions in both the lower and upper levels of the box that considerably more hand room is made available in the portion of the vertical shaft to which access may be had from the hand opening at the top of the box.

It is another object of my invention to provide a junction box through which the cables may be threaded and their direction of passage through the box changed through ninety degrees with the least degree of abruptness.

It is still another object of my invention to provide a junction box having its interior vertical partitions in both the lower and upper levels, so distorted that a large radius of curvature is possible in bending a cable through a vertical shaft from one level to another in order to facilitate its movement through the box and at the same time minimize the stresses set up in the bent cables when it is in its permanent location.

My invention will be better understood from the following description referring to the accompanying drawings, and the features of novelty which characterize my invention will be pointed out with particularity in the claims annexed to and forming a part of this specification.

In the drawings which illustrate embodiments of the invention,

Fig. 1 is a plan view of the junction box with the hand hole cover removed and showing three floor ducts passing through the box in one direction and each communicating with one of the corresponding ducts which lie at right angles.

Fig. 2 is a section taken along the line A—A.

Fig. 3 is a section taken along the line B—B.

Fig. 4 is a section taken along the line C—C.

Fig. 5 is a front elevational view of the box and seen in a section of the concrete floor on the line indicated by D—D on Fig. 1.

Fig. 6 is an exploded view of the box showing the cable channels within the box.

Referring to the drawings, Figs. 5 and 6 illustrate the junction box comprising three separate castings as follows, a lower portion or base of the box 2, an upper portion 3 of the box which is provided with a hand hole 4 and a cover retaining ring 5 and a set of interior partitions shown generally as at 6. The upper and lower castings are shown joined along the line 7 and bolt-holes 8 as shown in Fig. 1 are provided around the outer edges of the box for use in holding these two castings together. Casting 6 is held in place in the enclosure formed when the castings 3 and 4 are fitted together. The shape of the box is essentially square with the corners cut off so that provision may be made for conduit entrances 9.

The single casting 6 which makes up the partitions in the interior of the box comprises in addition to vertically positioned partitions a horizontal level shown generally at 10 midway of the height of the box and dividing the box into upper and lower levels. The lower level is divided into three generally parallel horizontal channels 11, 12 and 13 by vertical partitions 14 and 15. The upper level is divided into three transverse channels 16, 17 and 18 by partitions 19 and 20.

Each side of the upper casting 3 is provided with three equally spaced semi-elliptical openings 21 so that when the castings 2 and 3 are placed together along the line 7, these openings 21 line up with corresponding openings 22 along the upper edge of the side of the lower casting 2 to form elliptical duct openings 23. The duct openings 23 project beyond the outside edge of the box to form an elliptical receptacle 23a adapted to receive the ends of the entering ducts 24 as shown in Fig. 1. In the same way the conduit openings 9 are formed at the truncated corners of the box. The ducts 24 are terminated in these receptacles 23a and the cable within the duct is continued on through the box until it is withdrawn through a corresponding duct opening at one of the other sides of the box. Each of the ducts 24 extending in one direction communicates with one of the three lower channels 11, 12 and 13 and each of the three ducts extending in the other direction communicates with one of the three upper channels 16, 17 and 18 as shown in Fig. 6 by the arrows. It will be seen from Figs. 2 and 6 that the horizontal partition 19 slopes slightly upward towards the top of the box as shown at 25 and 26. Similar slopes 27 and 28 are provided from the horizontal partition 10 to the base of the box as shown in Figs. 3 and 6. These slopes provide for easier movement of the cables in the channels within the box as the cables are pulled through the duct into the junction box.

The path of the cable through the box may be seen clearly in Fig. 1 where upper level partitions are shown in dash lines extending generally from 6 to 12 o'clock of Fig. 1 while lower level partitions are in dash lines extending generally from 9 to 3 o'clock of Fig. 1. According to my invention in order to provide adequate hand room in the vertical shafts 29, 30, 31 for connecting cables between the upper and lower level, the vertical partitions 14, 15, 19 and 20 do not extend in a straight-line path from one side of the box to the opposite side but instead are distorted as shown in Figs. 1 and 6 so that vertical shafts 29, 30 and 31 are increased in size and consequently the portion of these shafts which is reached through central hand hole 4 is of much greater area than would otherwise be possible if the vertical partitions 14, 15, 19 and 20 continued in a direct path across the box.

The portion of the vertical shafts accessible through the hand hole 4 are shown as 33 and 34 for the two outer shafts and as 30 for the central shaft. Vertical shaft 30 is contained entirely within the cover supporting ring 5 so that it is completely accessible through the hand hole 4. Considerably more space is available for example at 33 in the shaft 29 than would have been possible if the lower or vertical partition 14 intersected the upper vertical partition 19 at right angles as would have been the case if the vertical partitions were made to extend across the junction box at right angles to the intersecting outer walls. Similarly the portion 34 of the vertical shaft 31 which falls within the boundaries of the cover supporting ring 5 is enlarged by altering the straight-line path of the vertical partitions 15 and 20.

As a result of the altered course of the channelling, a portion 35 and a portion 36 of partitions 19 and 20, respectively lie at an angle to the axes of the junction box. Sections 35 and 36 form the boundaries of the central vertical shaft 30 and form substantially chords of the circular cover retaining ring 5. In addition to the increased hand room made available by the revised path of the internal channels, the portions 35 and 36 of vertical partitions 19 and 20 respectively, which lie at an angle to the axes of the box, provide for easier manipulation of the cables as they are threaded through the channels. For example, if the path of the cable passing along the channel 16 is to be changed so that it emerges from the box through channel 11 it is obvious that by threading the cable through channel 16 and closely adjacent to vertical partition 19 that as it is manoeuvered into channel 11, since the radius of curvature of the necessary bend in the cable has been increased due to the distortion of the vertical partitions at the junction of vertical section 19 and vertical section 14, the path taken by the cable will occupy less space in the box and the cable will be more easily manipulated around the turn by inserting the hand into that portion 33 of the hand hole 4. Similarly a cable in upper channel 17 may be turned into lower channel 12 along a greater distance through vertical shaft 30 than would be possible if the boundaries of this shaft were parallel with the corresponding sides of the junction box. In addition to the ease of threading the cable through a vertical shaft from one level to another, the stresses set up in the bent portion of the cable when in its final position will be kept to a minimum if a large radius of curvature is possible through the cable bending area in a vertical shaft. Consequently the possibility of a damaged cable sheath surrounding the cable will be reduced.

It will be apparent that connections may be made between electrical cables lying in two channels at right angles to each other, through one opening only. In this way the cables of the various systems cannot be intermixed.

It has been noted that the truncated corners of the box are provided with conduit outlets 9. These are of use in making branch connections from the main feeder lines in the ducts to outlying switchboxes or other outlets.

The cover supporting ring 5 which is fitted in place on the top of the main upper casting 3 is provided with an inner flange 37 for supporting a circular hand hole cover 38. A gasket 39 may be provided to fit between the bottom of the cover supporting flange 37 and the top 40 of the casting 3. Hold down lugs 41 are provided on the cover supporting ring 5 through which bolts 42 may be threaded for the purpose of fastening down the cover supporting ring 5 and the gasket 39.

I have therefore provided a junction box for under floor duct systems in which the cable channelling is so positioned that ample room is provided for the hand to be inserted through a circular opening in the top of the box and at the same time allowing the use of an opening of minimum size. At the same time I have provided a box in which all possible precautions have been taken to guard against any wrong connections and each channel can be entered by one other channel only, the general direction of which is at right angles to the first channel and contains the corresponding electric system.

The novel feature of my box lies in the provision of distorted cable channels such that ample room is provided for the hand through the cover opening in making cable connections and in addition the task of threading cable through channels of the box is greatly simplified by cutting down on any sharp turns between interconnecting channels.

While the invention has been described by reference to a particular embodiment thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent in the United States is:

1. A conduit junction box comprising an upper casting, a matching lower casting and an inner casting, said upper casting having a circular hand hole centrally positioned in its upper surface to provide access to the interior of said box, said inner casting comprising a plurality of vertical walls and horizontal walls to divide the interior of said conduit junction box into a plurality of crossing channels arranged in two planes, said horizontal walls being constructed to interconnect each of said channels in one level respectively with one channel only in the other level thereby to provide a plurality of vertical shafts, the projection of said vertical walls on said hand hole forming a pattern wherein a major portion of said vertical walls lie in parallel chordal planes that divide a diameter perpendicular to said planes into substantially equal parts.

2. A conduit junction box comprising an upper casting, a matching lower casting and an inner casting, said upper and lower casting each having a plurality of matching semi-elliptical openings spaced about their peripheries to form elliptical access openings when said upper and lower castings are superimposed, said upper casting further having a circular hand hole including a removable cover positioned centrally in its upper surface to provide access to the interior of said junction box, said inner casting comprising a plurality of vertical walls and horizontal walls to divide the interior of said conduit junction box into a plurality of crossing channels arranged in two planes wherein all of said channels in one plane run in one direction and all of said channels in the other plane run substantially at right angles to said first named channels, said horizontal walls being positioned to interconnect each of said channels in one level respectively with one channel only in said other level thereby to provide a plurality of vertical shafts affording convenient access to any pair of crossing channels, whereby conduit in one channel can be spliced with conduit in its meeting channel, the projection of said vertical walls on said hand hole forming a pattern wherein a major portion of said vertical walls lie in a pair of parallel chordal planes that divide a diameter of said hand hole perpendicular to said planes into substantially equal portions.

3. A conduit junction box comprising an upper casting having a circular hand hole centrally positioned in its upper surface, a matching lower casting, an inner casting and means for securing said upper and lower castings in a superimposed position to define a hollow junction box, said inner casting comprising a pair of vertical walls and a horizontal wall dividing the interior of said conduit junction box into a plurality of crossing channels arranged in two horizontal planes wherein all of said channels in one plane run in one direction and all of said channels in the other plane run at right angles to said first-named channels, said horizontal wall being positioned to interconnect each of said channels in one level respectively with one channel only in said other level thereby to provide three vertical shafts affording convenient access to any pair of crossing channels whereby conduit in one channel can be spliced with conduit in its meeting channel, the projection of said vertical walls on said hand hole forming a pattern wherein a major portion of said vertical walls lie in a pair of parallel chordal planes that divide a diameter of said hand hole perpendicular to said planes into three substantially equal portions.

JOHN H. MARTIN.

REFERENCES CITED

The following references are of record in the file of this patent:

UNITED STATES PATENTS

| Number | Name | Date |
| --- | --- | --- |
| 1,626,570 | Walker | Apr. 26, 1927 |

FOREIGN PATENTS

| Number | Country | Date |
| --- | --- | --- |
| 42,985 | Netherlands | Apr. 15, 1938 |
| 376,423 | Great Britain | July 14, 1932 |